(12) United States Patent
Vyse et al.

(10) Patent No.: US 6,857,665 B2
(45) Date of Patent: Feb. 22, 2005

(54) LOCKWIRELESS ANTI-ROTATION FITTING

(75) Inventors: Gerrard N. Vyse, Azle, TX (US); Peter J. Stroempl, Fort Worth, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 36 days.

(21) Appl. No.: 10/444,005

(22) Filed: May 22, 2003

(65) Prior Publication Data

US 2004/0017077 A1 Jan. 29, 2004

Related U.S. Application Data

(60) Provisional application No. 60/398,532, filed on Jul. 24, 2002.

(51) Int. Cl.[7] .............................................. F16L 55/00
(52) U.S. Cl. ........................ 285/92; 285/276; 285/321; 285/388
(58) Field of Search ............................ 439/321; 285/86, 285/89, 92, 93, 276, 280, 307, 308, 309, 310, 321, 388, 387, 403

(56) References Cited

U.S. PATENT DOCUMENTS

| | | | |
|---|---|---|---|
| 2,051,889 A | | 8/1936 | Rose |
| 2,642,108 A | | 6/1953 | Geistert |
| 2,731,058 A | | 1/1956 | Smisko |
| 3,207,535 A | * | 9/1965 | Wilson ........................ 285/86 |
| 3,807,774 A | | 4/1974 | Heath, Jr. |
| 4,007,953 A | * | 2/1977 | Powell ........................ 285/321 |
| 4,834,667 A | * | 5/1989 | Fowler et al. .............. 439/321 |
| 5,058,930 A | | 10/1991 | Schlosser |
| 5,083,819 A | | 1/1992 | Bynum |
| 5,152,499 A | | 10/1992 | Silverman et al. |
| 5,192,219 A | * | 3/1993 | Fowler et al. .............. 439/321 |
| 5,340,162 A | | 8/1994 | Merrer et al. |
| 5,348,349 A | * | 9/1994 | Sloane ........................ 285/92 |
| 5,362,110 A | | 11/1994 | Bynum |
| 5,388,866 A | | 2/1995 | Schlosser |
| 5,558,376 A | * | 9/1996 | Woehl ........................ 285/276 |
| 5,586,790 A | | 12/1996 | Bynum |
| 5,823,702 A | | 10/1998 | Bynum |
| 6,293,595 B1 | | 9/2001 | Marc et al. |
| 6,302,447 B1 | | 10/2001 | Lee |
| 6,309,154 B1 | | 10/2001 | Higgins |

FOREIGN PATENT DOCUMENTS

| | | |
|---|---|---|
| DE | 715972 | 1/1942 |
| FR | 1525505 | 5/1968 |
| FR | 2 755 492 | 7/1998 |

* cited by examiner

Primary Examiner—David Bochna
Assistant Examiner—Aaron Dunwoody
(74) Attorney, Agent, or Firm—John A. Molnar, Jr.

(57) ABSTRACT

A lockwireless, anti-rotation fitting for connection to a connector. The fitting includes a coupler having a series of circumferential engagement portions disposed about an outer peripheral surface, and a nut receivable coaxially over the outer peripheral surface of the coupler, and which is threadably engageable with the connector. The nut also has a series of complementary circumferential engagement portions disposed about at an inner peripheral surface. With the nut being received coaxially over the first outer peripheral surface of the coupler, the nut is threadably engageable with the connector urging the coupler into a sealing engagement with a sealing surface of the connector, and with the coupler being engaged with the connector sealing surface, the first and second engagement portions are interengaged to delimit the rotation of the nut relative to the connector.

14 Claims, 11 Drawing Sheets

LOCKWIRELESS ANTI-ROTATION FITTING

CROSS-REFERENCE TO RELATED CASES

The present application claims the benefit of the filing date of U.S. Provisional Application Ser. No. 60/398,532, filed Jul. 24, 2002, the disclosure of which is expressly incorporated herein by reference.

BACKGROUND OF THE INVENTION

The present invention relates generally to compression-type fittings such as for coupling the end of a length of tubing to another member, and more particularly to such a fitting which is of an anti-rotation type and which may used as a replacement for conventional lock or safety wire fittings.

Compression fittings are widely used in a variety of instrumentation, pneumatic, hydraulic, process, power, refrigeration, industrial, mobile, transportation, aerospace, military, and other fluid power or control applications utilizing plastic or metal tubing. Typically employing an internally or externally threaded nut and an associated ferrule, flare, or other tube end which is formed or provided to seal between the tubing and a complementary-threaded, relative to the nut, nipple, adapter, body, or other connector, these fittings have been adapted for use with many different tubing types including metals such as copper, brass, steel, stainless steel, titanium, aluminum, and alloys such as nickel-copper, Hastelloy®, Alloy 600, 6Mo, Inconel®, Incoloy®, and the like, and many plastics.

Particularly for commercial or military aerospace applications, it may be specified, such as in accordance with Aerospace Standard AS1043 and Military Standard MS33540, that the fitting connection be safety or "lock" wired after assembly to prevent the accidental loosening of the fitting due to vibration or other forces which may be developed in the service environment. Representative lock wire fittings are shown, for example, in U.S. Pat. Nos. 3,807,774; 2,642,108; and 2,051,899.

In practice, the safety wiring of the connection can be difficult. Accordingly, special fittings have been designed which eliminate the need for safety wiring. Generally, these fittings employ a modified adapter having a collar or other arrangement of tangs which engage a series of grooves provided on the nut (or vice versa) so as to provide a ratcheting effect which in service delimits the rotation of the nut relative to the adapter, but which still allows for the connection to be disassembled using a wrench or other tool. Representative fittings of this type are shown, for example, in U.S. Pat. Nos. 6,309,154; 6,302,447; 6,293,595; 5,823, 702; 5,586,790; 5,388,866; 5,362,110; 5,083,819; 5,058, 930; and 2,731,058.

It is believed, however, that further improvements in the design of "lockwireless" fittings, i.e., anti-rotation fittings which do not employ a lock wire, would be well-received for commercial and military aerospace use, as well as for other applications. In this regard, the fittings which heretofore have constituted the state of the art typically must employ specially designed adapters and other components which may involve added expense, require special tools or steps for make-up, and/or may not be as robust as conventional componentry if dropped or otherwise subjected to rough handling. Accordingly, it is believed that particularly desired would be a "lockwireless" fitting which employs more standard componentry, which is robust, and which may be made or disassembled in a more conventional fashion so as to have a familiarity to technicians and other involved in the installation or maintenance thereof.

SUMMARY OF THE INVENTION

The present invention is directed, broadly, to lockwireless fittings. More particularly, the invention is directed to a lockwireless fitting construction, such as for tubing, which eliminates the need for a special adapter, and which is robust and economical to manufacture.

In an illustrated embodiment, the fitting is provided in accordance with the precepts of the present invention as including a coupler and an associated nut. The coupler may be configured at one end for a welded or other connection to an end of a length of tubing or other conduit, and at an opposite end for sealing against an adapter or other connector. The nut is receivable over the coupler, and is threadably engageable with the adapter for urging the one end of the coupler into a compressive, sealing engagement with the adapter. The coupler is formed or otherwise provided as having a series of recesses disposed circumferentially about an outer peripheral surface thereof. The nut, in turn, is provided, such as via an inserted spring clip, as having series of lobes disposed circumferentially about an inner surface thereof. Upon make-up, the lobes of the nut inner surface are ratchetably engageable with the recesses of the coupler outer surface. In service, such engagement delimits the rotation of the nut relative to the adapter, such as may be induced by vibratory or other external forces or loadings, so as to provide a self-locking feature. For disassembly, however, the lobes and recesses may be disengaged responsive to a torque which exceeds a certain threshold, such as may be developed by a wrench or other tool used to loosen the nut.

The present invention, accordingly, comprises the article possessing the construction, combination of elements, and arrangement of parts which are exemplified in the detailed disclosure to follow. Advantages of the invention include a fitting construction which uses conventional componentry to allow for assembly and disassembly in a familiar fashion, but which is self-locking for aerospace and other applications wherein the fitting will be exposed to vibration or other forces, or otherwise for applications requiring a locking fitting.

BRIEF DESCRIPTION OF THE DRAWINGS

For a fuller understanding of the nature and objects of the invention, reference should be had to the following detailed description taken in connection with the accompanying drawings wherein.

Figure 1:
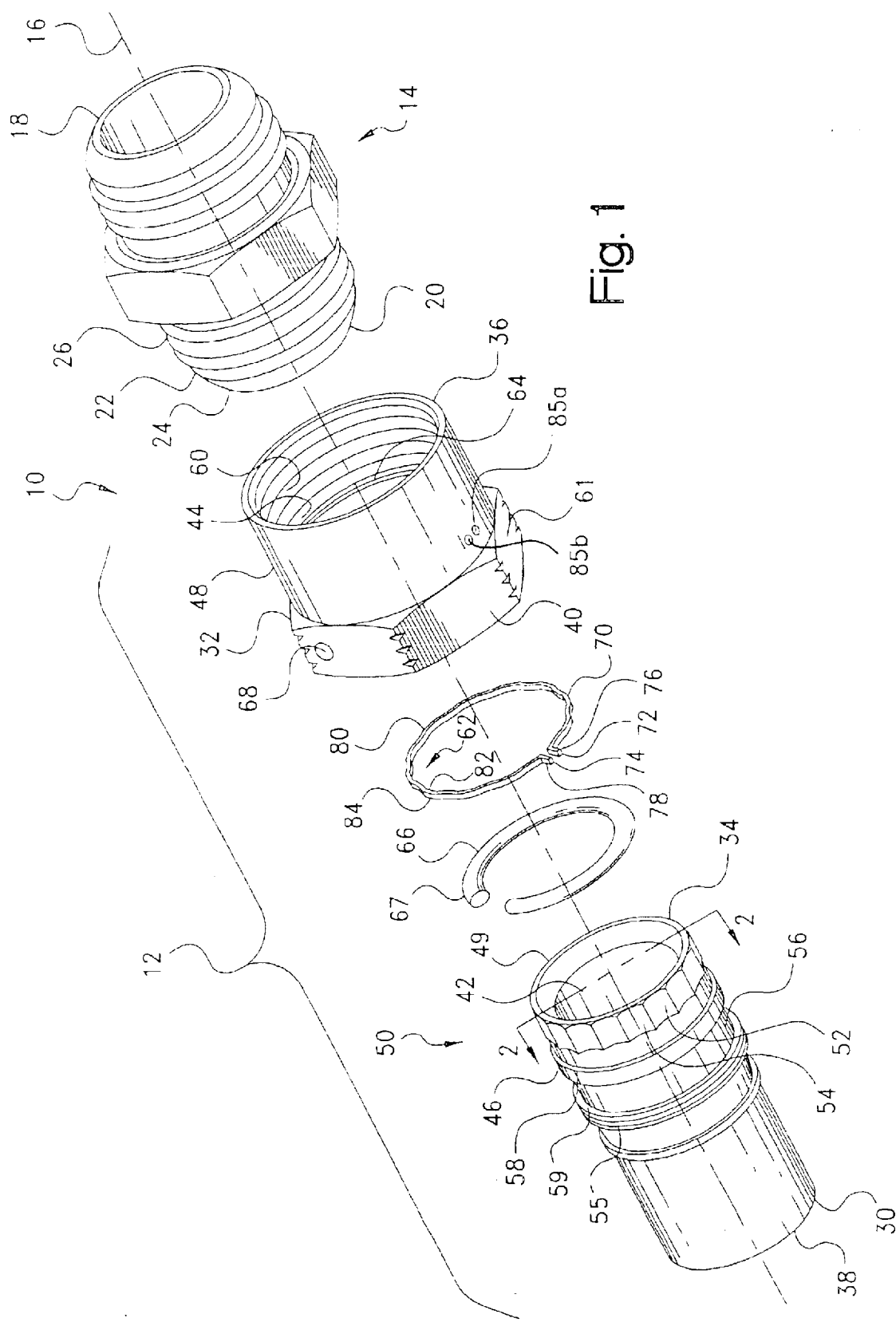
FIG. 1 is a perspective, exploded view showing a standard adapter/connector and a lockwireless fitting configured in accordance with the present invention for connection to the connector, the fitting including a coupler and an associated nut within which is mounted a lobed spring clip.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," "top" and "bottom," and "right" and "left" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "vertical" and "axial" or "horizontal" referring, respectively, to directions or planes perpendicular and parallel to the longitudinal central axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For the illustrative purposes of the discourse to follow, the precepts of the fitting construction of the present invention are described in connection with a generalized adapter configuration such as a nipple. It is to be appreciated, however, that the present invention will find application in many connector configurations, such as unions, straights, tees, elbows, and crosses, and as port connections for valves, cylinders, manifolds, sensors, and other fluid components. Use within these and other configurations and components therefore should be considered to be expressly within the scope of the invention herein involved.

Referring then to the figures wherein corresponding reference characters are used to designate corresponding elements throughout the several views with equivalent elements being referenced with prime or sequential alphanumeric designations, a fitting connection in accordance with the present invention is shown generally at 10 in the exploded view of FIG. 1. As may be seen, connection 10 includes a fitting assembly, referenced generally at 12, which is configured in accordance with the present invention, and a connector, referenced generally at 14.

Connector 14 extends coaxially with a central longitudinal axis, 16, intermediate a forward end, 18, and a rearward end, 20. By way of convention, axial directions along axis 16, which for purposes of convenience will be used as a common reference axis for each of the components as arranged for the assembly of connection 10, will be referred to as "forward," "forwardly," or "front" if in the direction of or towards or adjacent the connector forward end 18, and as "rearward," "rearwardly," or "rear" if in the opposite direction of or towards or near the connector rearward end 20. The connector 14 has an outer surface, 22, which is configured adjacent the rearward end 20 to define a generally conical, tapered sealing surface, 24, and which is configured intermediate the sealing surface 24 and the forward end 18 to define an externally threaded portion, 26.

The fitting assembly 12 includes a generally annular coupler, 30, and associated nut, 32, each which extends along axis 16 intermediate a forward end, 34 and 36, respectively, and a rearward end, 38 and 40, respectively. Each of the coupler 30 and nut 32 also has an inner peripheral surface, 42 and 44, respectively, and a outer peripheral surface, 46 and 48, respectively. The coupler rearward end 38 may be configured for a welded or other connection to the distal end of a length of tubing (not shown) so as to allow for the fluid tight connection of the tubing end to the coupler 30 and, in turn, to the connector 14. For many applications the tubing will be metal, but alternatively may be plastic or a composite material. The coupler forward end 34, in turn, may be configured as at 49 to define a generally conical, tapered sealing surface which is the complement of the connector sealing surface 24 so as to be seatable thereagainst for the fluid-tight connection of the coupler 30 to the connector 14.

Figure 2:
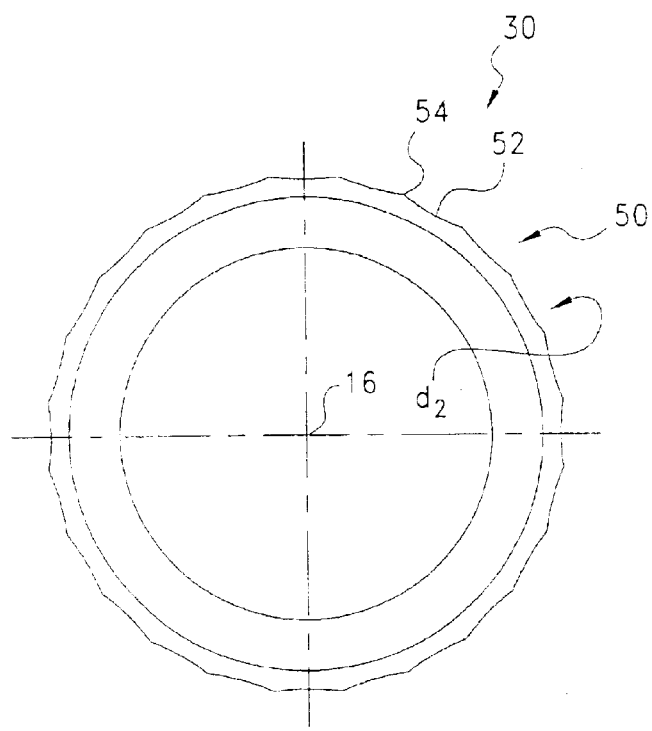
FIG. 2 is a radial cross-sectional view of the coupler of FIG. 1 taken in the direction of line 2—2 of FIG. 1 and showing a series of recesses formed circumferentially into a section of the outer surface the coupler.

Coupler 30 is configured as having a series of first engagement portions, referenced generally at 50, disposed circumferentially about at least a section of the outer peripheral surface 46. As may be seen with additional reference to the radial cross-sectional view of coupler 30 shown in FIG. 2, first engagement portions 50 may be provided as a series of radially spaced-apart recesses, one of which is referenced at 52, which may be machined, molded, stamped, or otherwise formed into the outer peripheral surface 46. Although the recesses 52 are shown to be generally concave "scallops" separated by ridges, one of which is referenced at 54, it will be appreciated that other shapes or configurations may be substituted, such as wherein the ridges 54 are replaced by convex scallops or other smoother junctures, or wherein the recesses 52 are configured as inclined ramps separated by steeply angled or even vertical walls to provide a more ratchet-like effect. The coupler outer peripheral surface 46 also may be provided as having a circumferential ridge indicia or other visual and/or tactile indicator, 55, formed intermediate the rearward end 38 and the first engagement portions 50, and as having a circumferential groove, referenced at 56, formed therein intermediate the indicator 55 and the first engagement portions 50. As may be seen, the groove 56 terminates in one axial direction along axis 16 at a forward end wall, 58, and in the other axial direction at a rearward end wall, 59.

Nut 32 is configured, in turn, to be receivable coaxially over the coupler outer peripheral surface 46, with the inner peripheral surface 44 of the nut forward end 36 being internally threaded, as shown at 60, such that the nut is rotatably threadably engageable with the externally threaded portion 26 of the connector 14. In this regard, the nut outer peripheral surface 46 may be configured as having hexagonal or other flats, such as at 61, for engagement with a wrench or other make-up tool.

Figure 4:
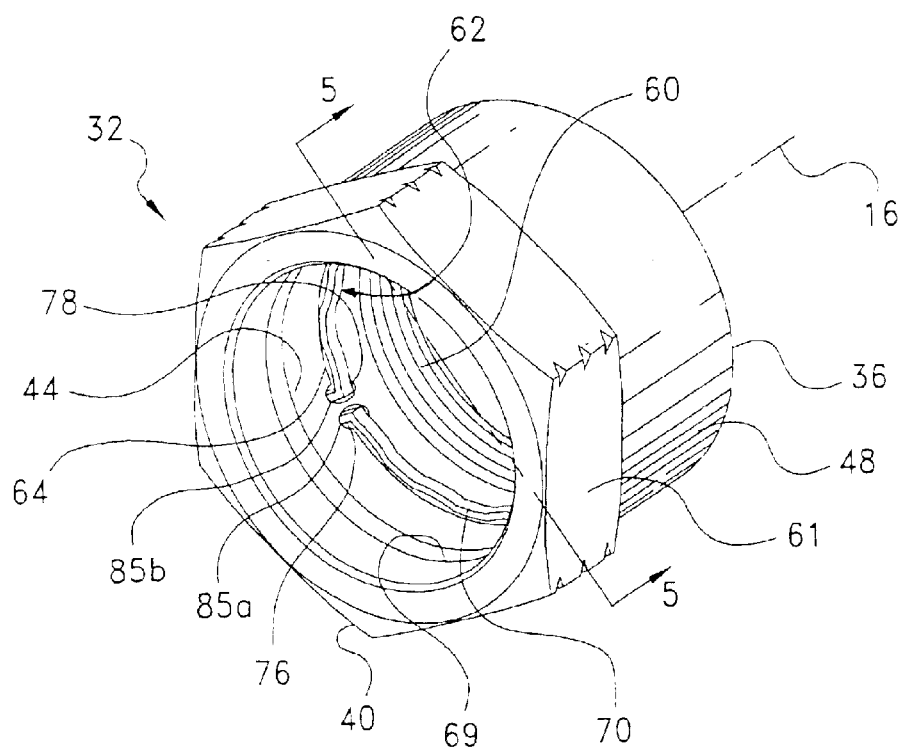
FIG. 4 is a perspective view showing the assembly of the spring clip of FIGS. 1 and 3 to the nut of FIG. 1.

Similar to the coupler outer peripheral surface 46, and as may be seen best with momentary reference to the nut assembly view shown in FIG. 4, the nut inner peripheral surface 44 has a series of second engagement portions, referenced generally at 62, disposed circumferentially about at least a section thereof such as intermediate the threaded portion 60 and the rearward end 40. The surface 44 also may be provided as having a circumferential groove, 64, which may be seen best with additional reference to the cross-sectional assembly view of FIG. 6, formed therein for the second engagement portions 62, and as having a thrust surface, 66, which also may be seen in the assembly view of FIG. 6 to extend radially inwardly therefrom the surface 44 such as intermediate the groove 64 and the rearward end 40. Thrust surface 66 may be formed as an internal shoulder of the nut 32 or, as shown, as a thrust wire, 67, which wire, with the nut 32 having been received over the coupler outer peripheral surface 46, may be inserted through a hole, referenced at 68 in FIG. 1, and received within a circumferential groove, referenced at 69 in FIG. 6, formed into the nut inner peripheral surface, such as intermediate the nut rearward end 40 and the other groove 64. As also received within the coupler groove 56, thrust wire 67 thereby locks nut 32 together with coupler 30.

Figure 3:
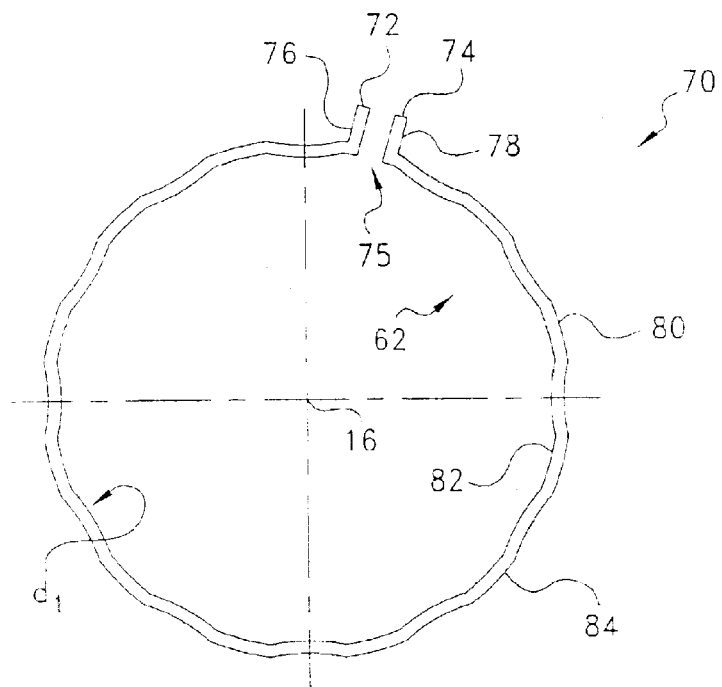
FIG. 3 is a front view of the spring clip of FIG. 1.

Returning again to FIG. 1, it may be seen that the second engagement portions 62 may be defined by a generally annular spring clip, 70, which may be insertably mounted, or otherwise retained in the groove 64 of the nut inner peripheral surface 44. With additional reference to the front view of the clip 70 shown in FIG. 3, clip 70, may be shaped from a length of a flat, round, or other profile metal or other wire or strip to form a resilient, split-type ring. In such configuration, clip 70 may extend circumferentially from a first end, 72, to a second end, 74, circumferentially spaced-apart from the first end 72 by a gap or clearance, referenced at 75, and with each of the ends 72 and 74 being further shaped to have an extension, 76 and 78, respectively, extending radially outwardly therefrom. The circumferential portion, 80, of the clip 70 extending between the ends 72 and 74 may be alternatingly, i.e., undulatingly, wave-shaped whereby the wave troughs define a series of lobes, one of which is referenced at 82, which are separated by the wave crests, one of which is referenced at 84. The shape and number of the lobes 82 and the coupler recesses 52 are complementary in the manner to be further described hereinafter. In general, however, the lobes 82 are configured to be received in the recesses 52, with one of the number of lobes or recesses being even and the other being odd. However, it should be understood that the arrangement of lobes and recesses may be reversed on the coupler and nut, with the coupler 30 being configured as defining or otherwise having lobes and the nut 32 being configured as defining or otherwise having the recesses.

The exact number of lobes and recesses is not critical, and generally will depend upon the tube size or other size of the fitting assembly 12, with the number of recesses 52 typically be more than the number of lobes 82. Also, the inner diametric extent, referenced at $d_1$ in FIG. 3, of the clip circumferential portion 80 preferably is marginally less, in a normal or contracted orientation of the clip 70, than the outer diametric extent, referenced at $d_2$ in FIG. 2, of the coupler forward end 34, but is resiliently expandable in an energized orientation to an outer diameter allowing the outer diametric extent $d_2$ the coupler forward end 34 to be received therethrough.

Figure 5:
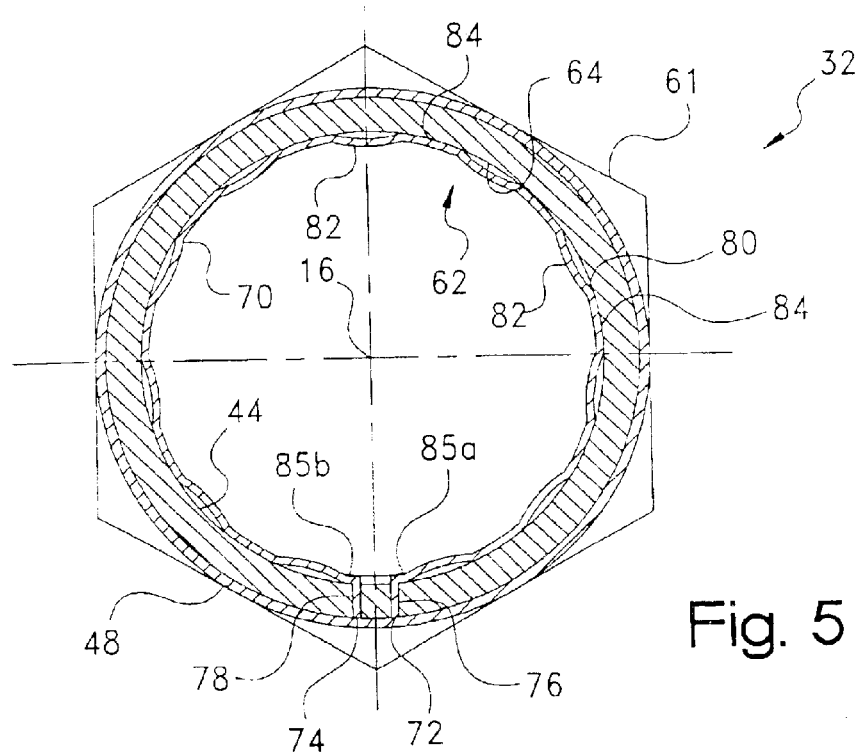
FIG. 5 is a radial cross-sectional view of the nut assembly of FIG. 4 taken in the direction of line 5—5 of that figure.

Returning once again to FIG. 1, nut 32 further is configured as having a pair of radial slots, 85a–b, formed therein, such as by electric discharge machining (EDM) or other forming operation, for the retention of clip 70 within groove 64. Referring additionally to the nut assembly views of FIGS. 4 and 5, it may be seen that clip 70 is retained within groove 64 with each of the clip extensions 76 and 78 being insertably received within a corresponding one of the slots 85a–b. In this regard, and as is shown best in the cross-sectional view of FIG. 5, each of the slots 85a–b which are spaced-apart radially about the circumference of nut 32, extend radially inwardly to open into the groove 64 through the nut inner peripheral surface 44, and radially outwardly to either terminate intermediate the inner and outer peripheral surfaces 44 and 48 so as to be internal, or to extend through the outer peripheral surface 48, with the length of the extensions 76 and 78 being adjusted accordingly. Also, each of the slots 85a–b may have a circumferential extent or width, so as to allow for the clip extensions 76 and 78 to be movable therein for accommodating the opening and closing of the clip circumferential portion 80 as the inner diametric extent $d_1$ thereof is expanded and contracted. It will be appreciated that clip 70 alternatively may be fabricated in two or more sections, such as in a pair of half sections with each section being formed as having a set of extensions 76 and 78 disposed at about 180° apart.

Figure 5A:
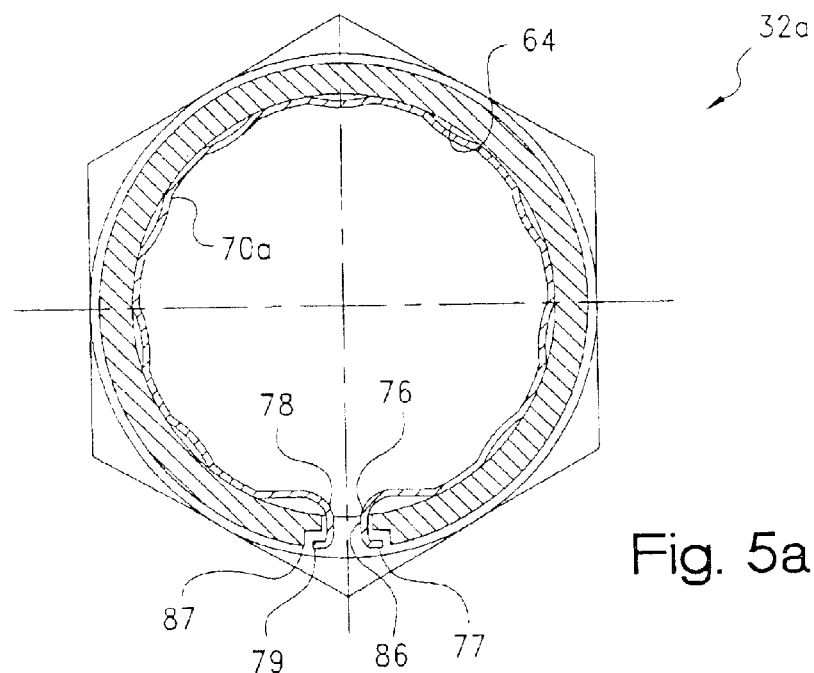
FIG. 5a is a radial cross-sectional view as in FIG. 5 showing an alternative arrangement for the assembly of the spring clip of FIGS. 1 and 3 to the nut of FIG. 1.

Looking momentarily to FIG. 5a, as is shown at 32a, nut 32 alternatively may be configured as having a single radial slot, 86, formed therein for the retention of clip 70, now represented at 70a. Further in this regard, the ends of the extensions 76 and 78 each may be bent or otherwise configured so as to form an additional extension portion, 77 and 79, respectively. As is shown, the portions 77 and 79 each may extend radially outwardly from a corresponding one of the extensions 76 and 78 to effect the further retention of the clip 70a by hooking into the slot 86, or, more particularly, a recessed portion, 87, thereof. Such retention also may delimit any tendency for the clip 70a to rotate within the groove 64 with the effect of being displaced therefrom such as being forced out through the slot 86.

Figure 6:
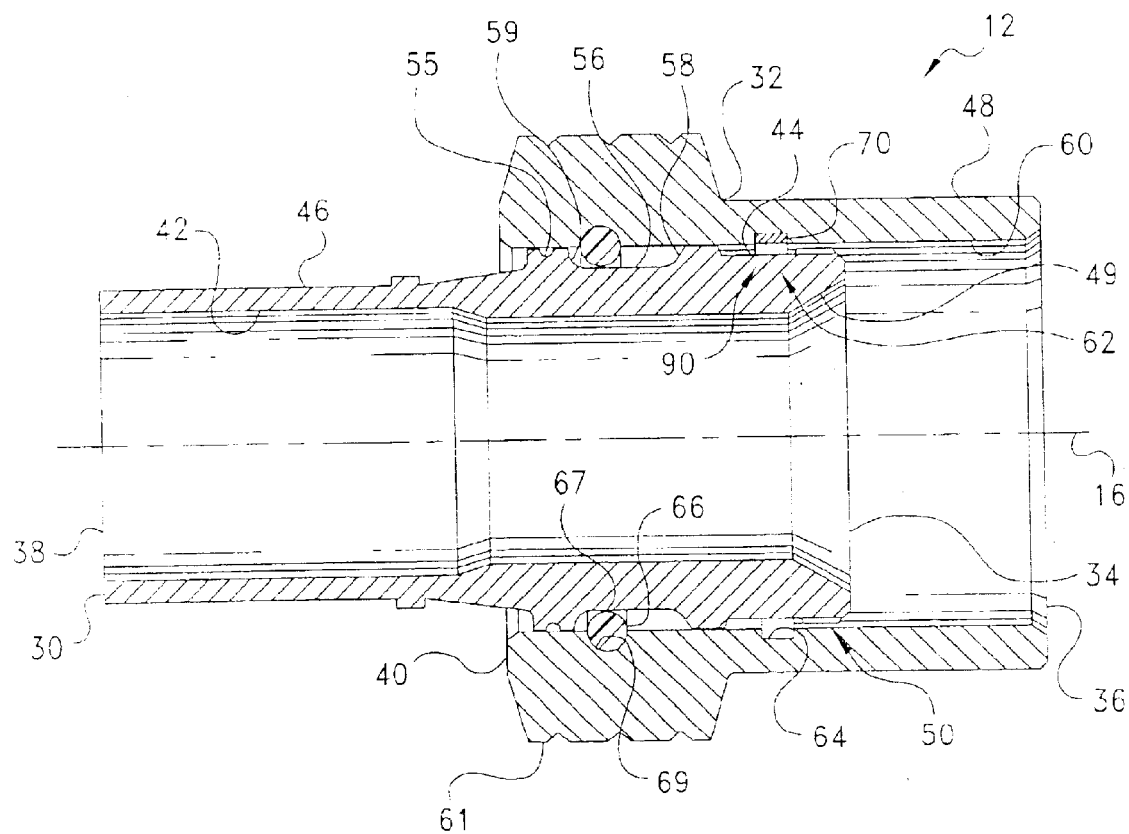
FIG. 6 is a longitudinal cross-sectional view showing the fitting of FIG. 1 as assembled for connection to the connector of that figure.

With reference now to FIG. 6, in the fitting 12 as assembled for connection to the connector 14. As assembled, clip 70 is retained within nut 32, with the nut rearward end 40 being received coaxially over the coupler outer surface 46, and with the thrust wire 67 being received for axial, i.e., translational, movement within the coupler groove 56. That is, the nut 32 is moveable axially relative to coupler 30 from a rearward position generally adjacent the groove rearward end wall 59 wherein the nut 32 is freely rotatable on the coupler 30, to a first forward axial position. In such first axial positioning, designated at 90, of the nut 32 relative to coupler 30, wire 67, along with the thrust surface 66 thereof, is disposed intermediate the groove forward and rearward end walls 58 and 59, with the first and second engagement portions 50 and 62 being just interferingly engaged.

Figure 7:
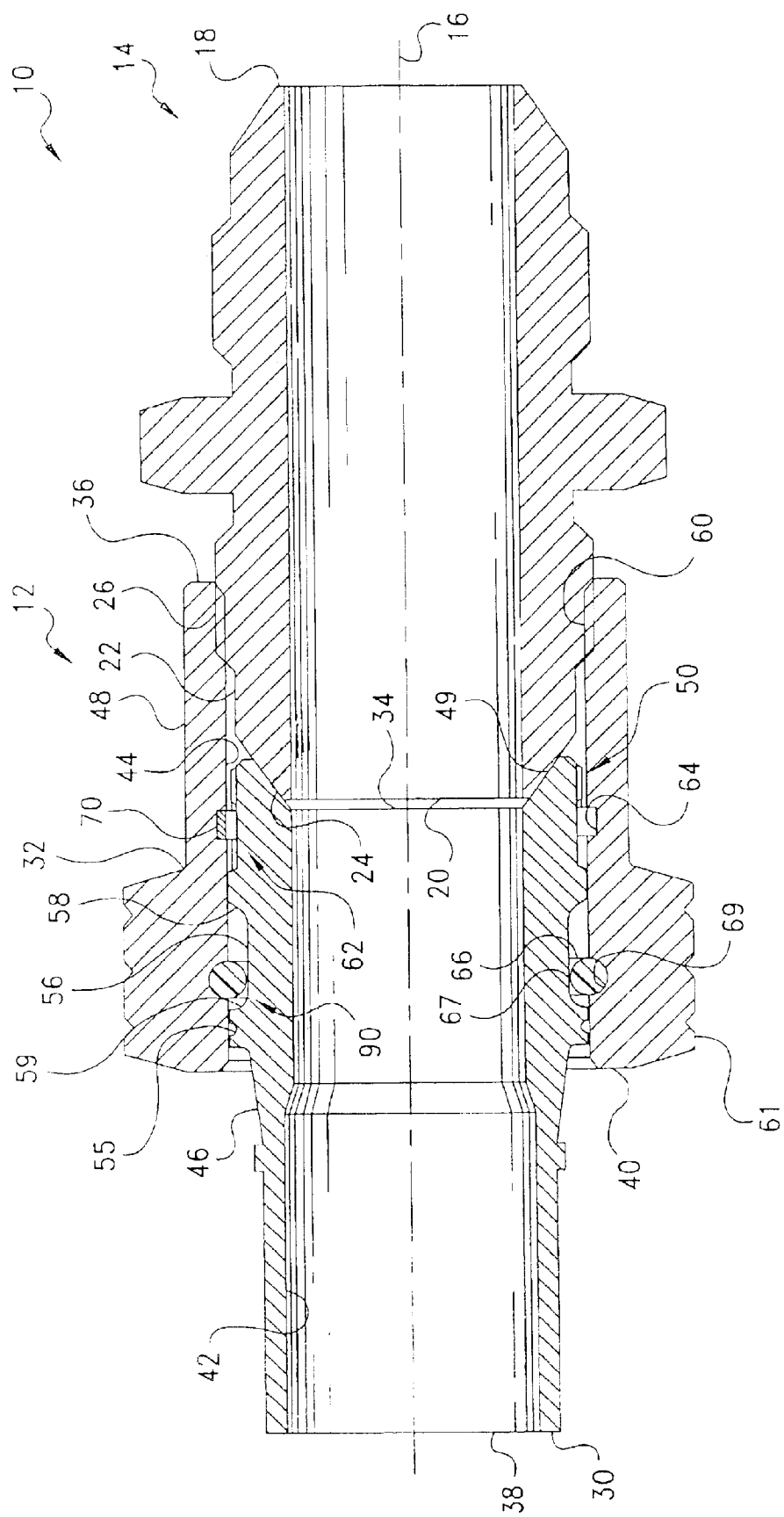
FIG. 7 is a longitudinal cross-sectional view as in FIG. 6 showing the initial, hand-tight connection of the fitting to the connector.

Looking now to FIG. 7, the make-up of the 10 connection continues with nut forward end 36 being partially threaded onto connector rearward end 20, such as by the hand-tight rotation of the nut 32 effecting the engagement of the external threads 26 of the nut with the internal threads 60 of the connector. As the hand or other tightening of the nut 32 proceeds, the sealing surface 49 at the coupler forward end 34 is drawn towards the connector sealing surface 24 by the interfering engagement of the first and second engagement portions 50 and 62 in the axial positioning 90 of the nut 32.

Figure 8:
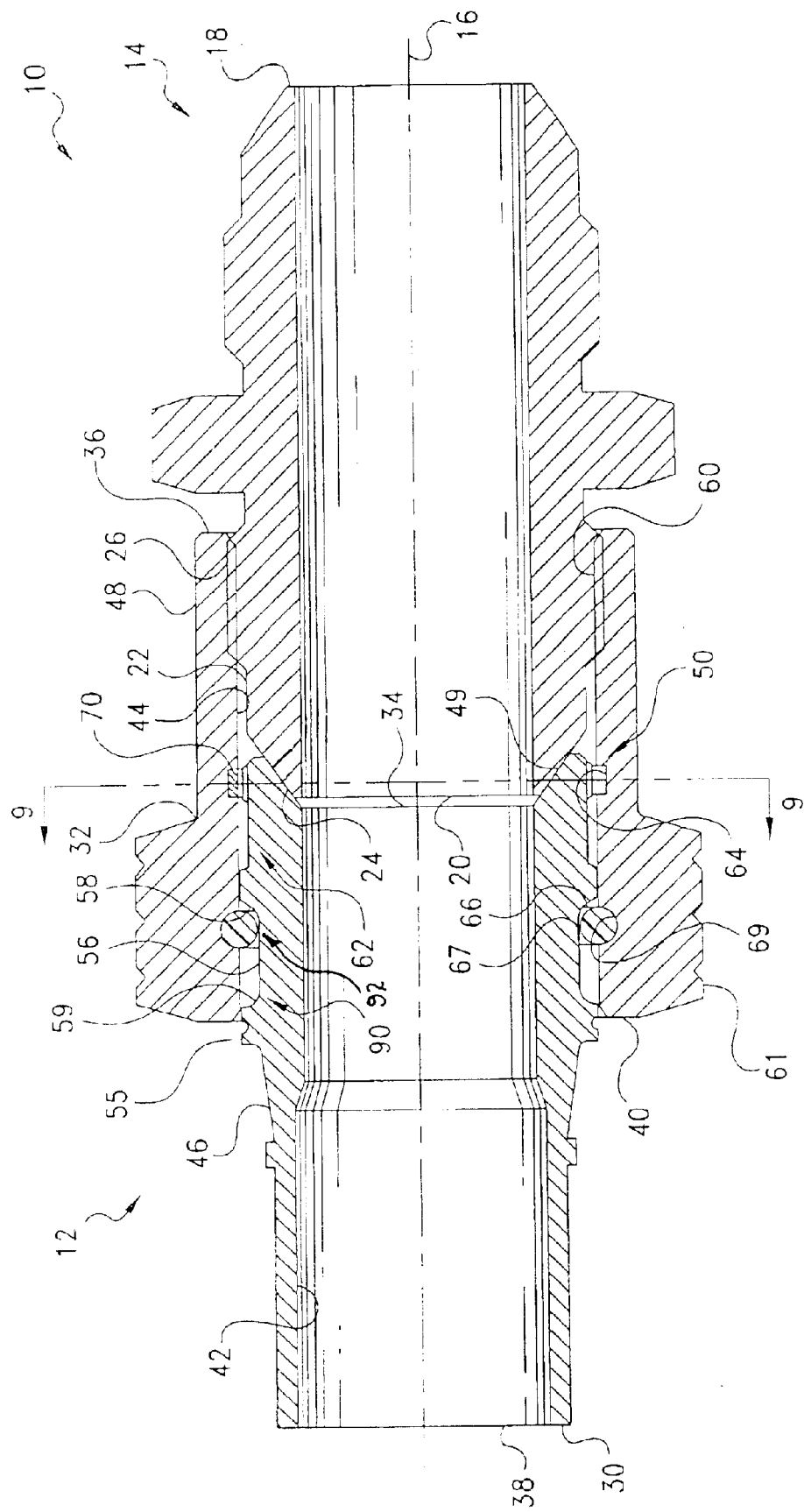
FIG. 8 is a longitudinal cross-sectional view as in FIG. 7 showing the final connection of the fitting to the connector.

Continuing to FIG. 8, the make-up of connection 10 is completed with the nut forward end 36 being further threaded, such as by the rotation of nut 32 with a wrench or other tool engaging the flats 61, onto the connector rearward end 20. Such rotation causes the forward axial advancement of the nut thrust surface 66 within the coupler groove 56 into an abutting contact with the coupler groove forward end wall 58 which functions as a bearing surface. Such contact, in a second forward axial positioning designated at 92 of the nut 32, urges the sealing surface 49 at the coupler forward end 34 into a compressive, fluid-tight sealing engagement against the connector sealing surface 24. When the connection 10 is fully tightened or torqued, the indicia 55 on the coupler outer peripheral surface 46 may be revealed from under nut 32 so as to provide a visual and/or tactile indication that the nut 32 is disposed in position 92 securing the connection 10. Advantageously, the described construction of fitting 12 allows for the fitting to be initially hand-tightened onto the connector 14 and thereby speeds the make-up of the connection 10. Such construction in its fully torqued orientation substantially seals the connection 10 against the ingress of dirt, dust, or other contaminants insofar as the forward side thereof is sealed by the engagement of threads 26 and 60, with the rearward side being sealed by the abutting, metal-to-metal of other sealing engagement of the nut thrust surface 66, such as on the thrust wire 67 or nut shoulder as the case my be, against the groove forward end wall 58.

Figure 9:
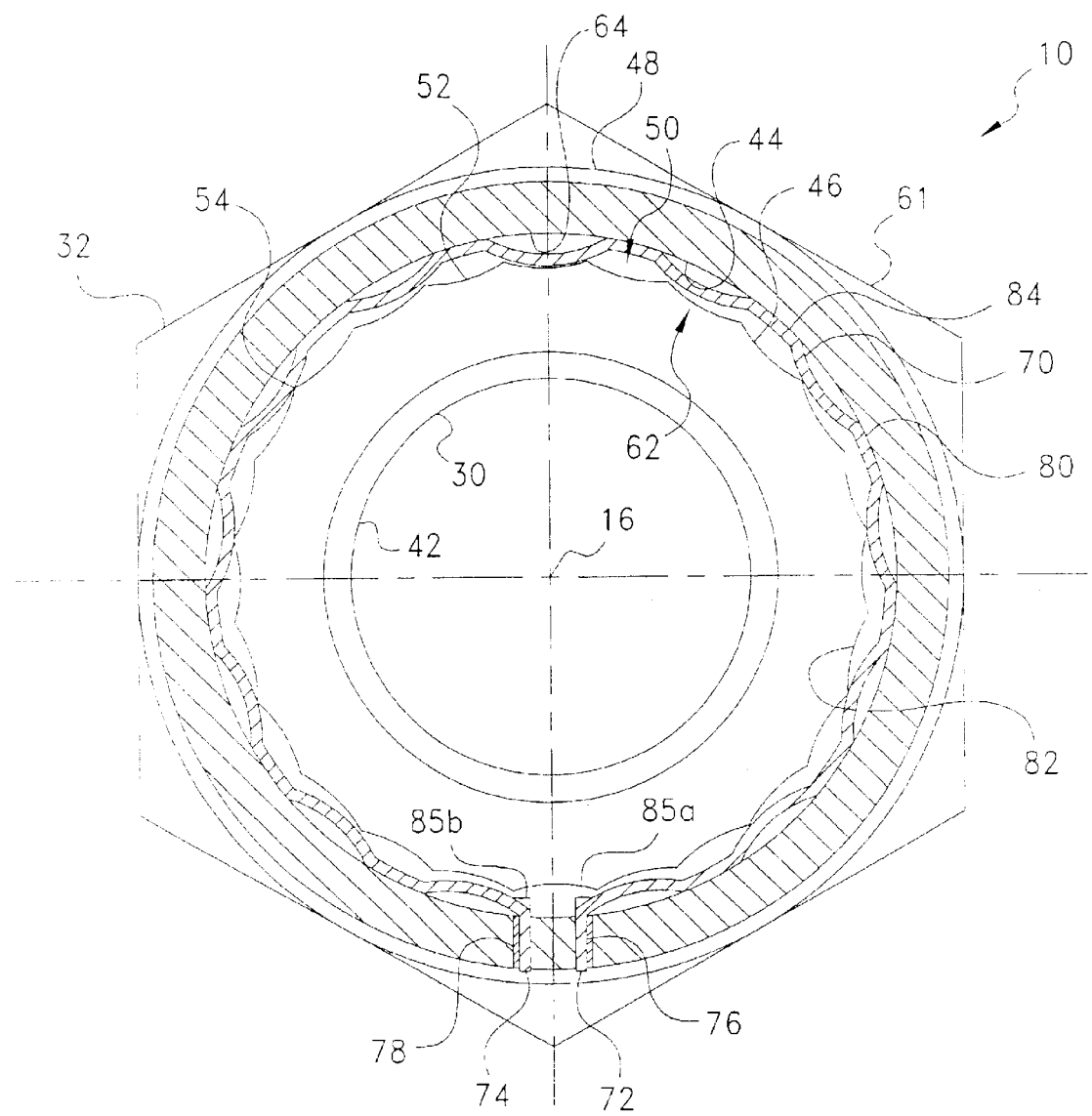
FIG. 9 is a radial cross-sectional view of the connection of FIG. 8 taken through line 9—9 of that figure and showing the lobes of the spring clip as ratchetably engaged with the coupler recesses.

Further in the axial position 92 of the nut 32, the first and second engagement portions 50 and 62 are fully or more fully interengaged for delimiting the rotation of the nut 32 relative to the connector 14. In such engagement, and as may be seen with reference now to the cross-sectional view of FIG. 9, with the clip circumferential portion 80 having been resiliently expanded, such as by the flexing of lobes 82 upon contact with the ridges 54, to pass forwardly over the coupler forward end, each of the clip lobes 82 generally may be received within a corresponding one of the coupler recesses 52 as the clip circumferential portion 80 thereafter compresses or otherwise contracts radially about the coupler forward end. As the frictional, spring, and/or other forces developed by the ratchet-like engagement between the first and second engagement portions 50 and 62 must be overcome for the nut 32 to rotate relative to the connector 14, such engagement thereby is effective in service to resist vibration and other external forces which otherwise could have the tendency to loosen the connection 10. However, with sufficient torque being applied, such as with a wrench or other tool, the nut 32 may be loosened to break the connection 10, with the clip circumferential portion 80 again being expandable, but as now to pass rearwardly over the coupler forward end to allow for the nut 32 to be unthreaded from the connector 14.

Figure 10:
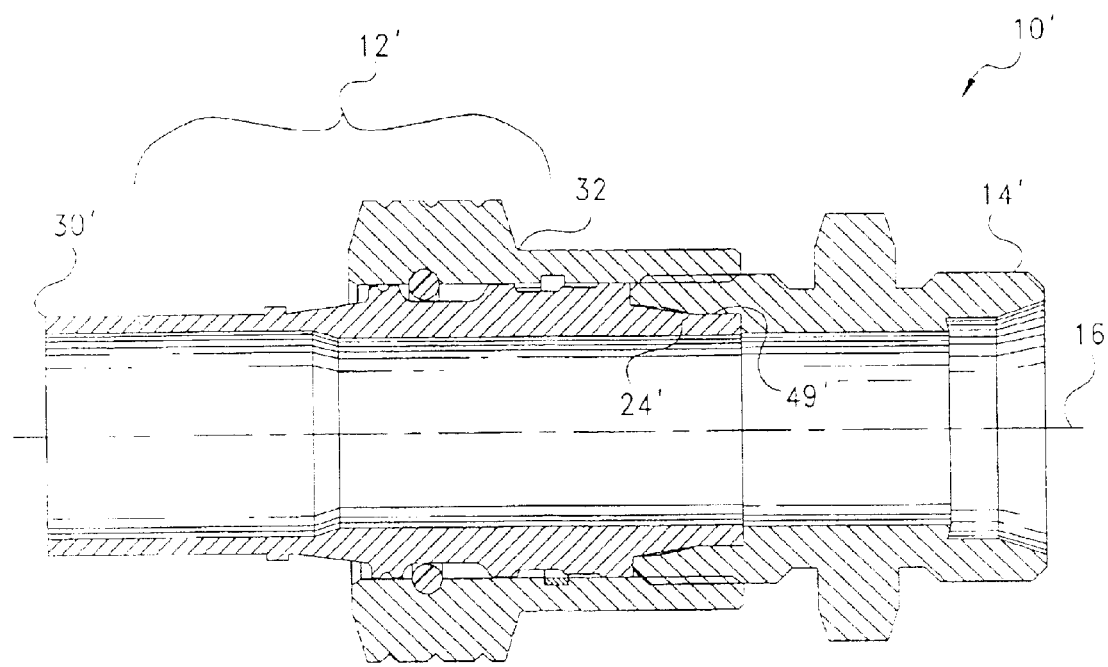
FIG. 10 is a longitudinal cross-sectional view showing the initial, hand-tight connection of the fitting to the connector in an alternative style of the connection of the present invention.
Figure 11:
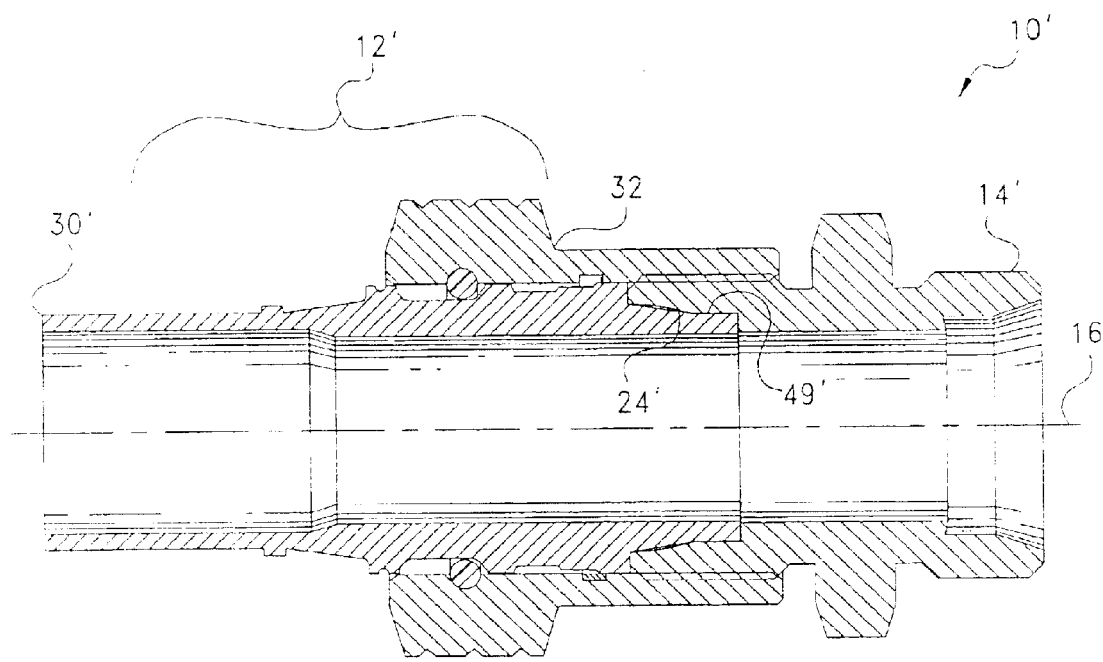
FIG. 11 is a longitudinal cross-sectional view as in FIG. 10 showing the final connection of the fitting to the connector.

Turning now to FIGS. 10–15, three alternative styles of connection 10 are shown for illustrative purposes in FIGS. 10–11, 12–13, and 14–15, respectively, in both hand-tight (FIGS. 10, 12, and 14) and full torque (FIGS. 11, 13, and 15) orientations. With reference first to FIGS. 10 and 11, connection 10 reappears at 10' with fitting 12' being styled for a "flareless," swivel connection. In this regard, coupler 30, now reappearing at 30', is configured as per NAS-1760 as having an outer sealing surface 49', with connector 14, now reappearing at 14', being complementarily configured as per MS21902 as having an inner sealing surface 24' which is a mate to the coupler outer sealing surface 49'.

Figure 12:
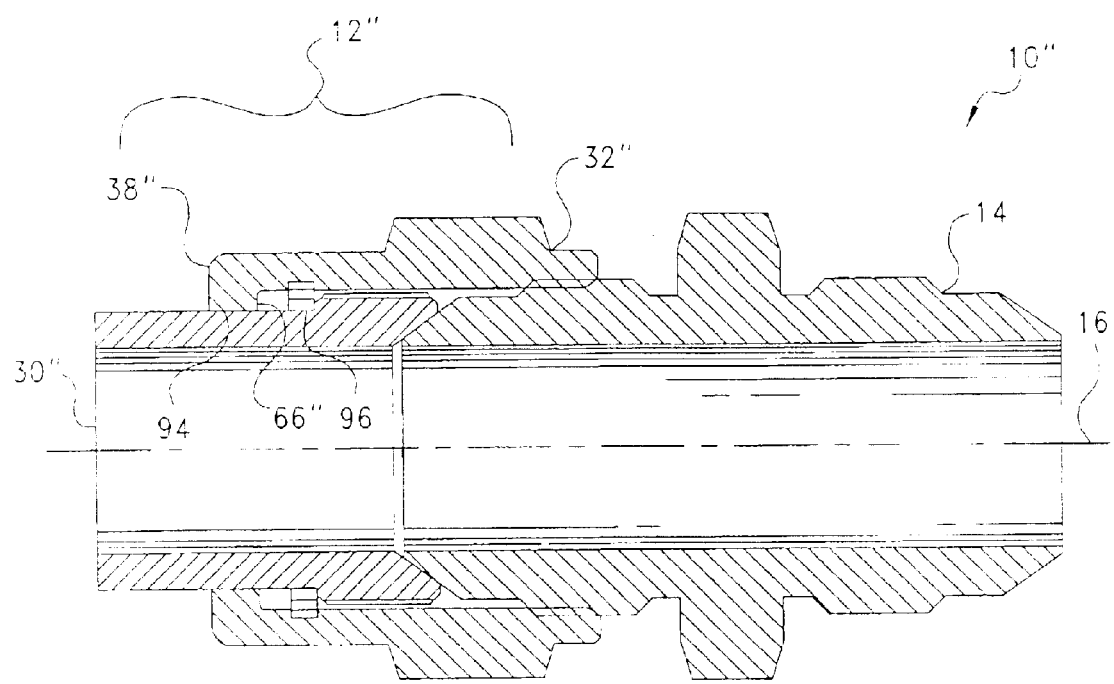
FIG. 12 is a longitudinal cross-sectional view showing the initial, hand-tight connection of the fitting to the connector in another alternative style of the connection of the present invention.
Figure 13:
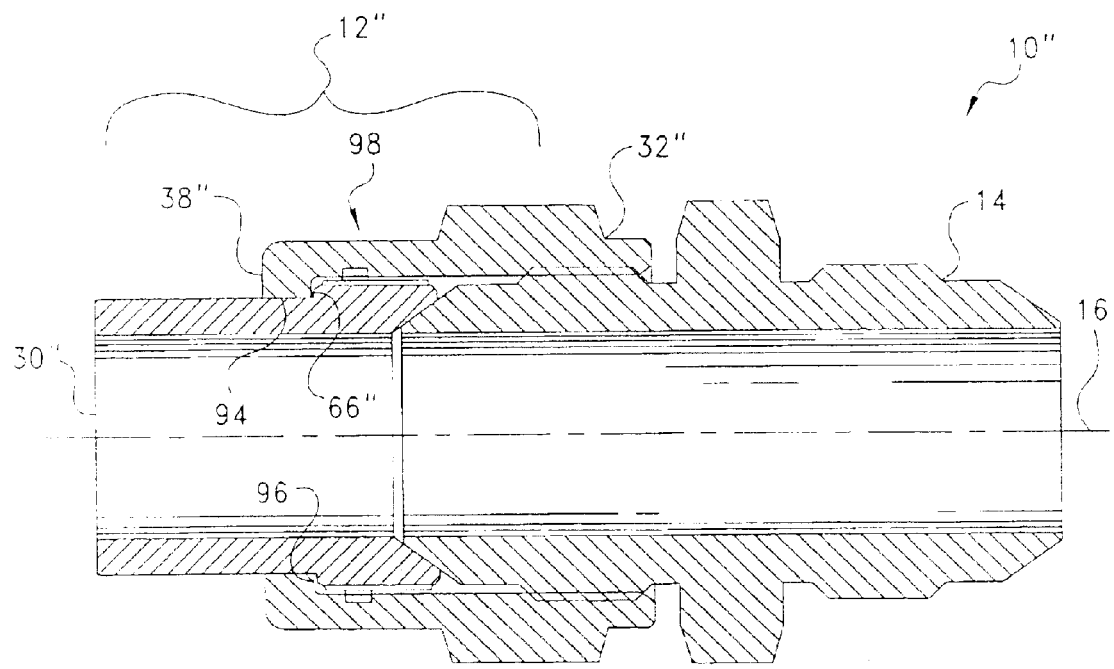
FIG. 13 is a longitudinal cross-sectional view as in FIG. 12 showing the final connection of the fitting to the connector.
Figure 13A:
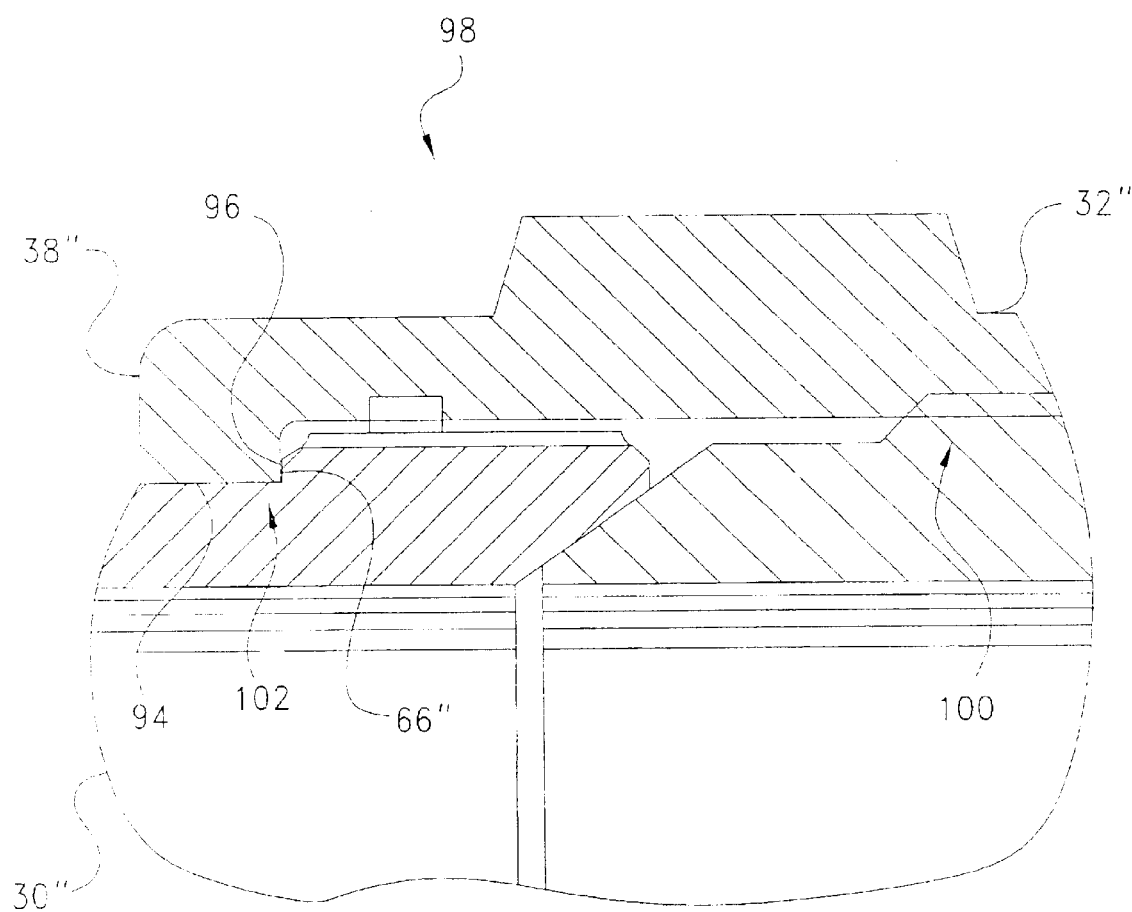
FIG. 13a is a magnified of an area of FIG. 13.

Referring next to FIGS. 12–13, connection 10, reappearing now at 10", is provided with fitting 12" being configured for connection to connector 14 which may be as per SAE AS4325. In this regard, fitting 12" has a nut 32" which includes thrust surface 66", as formed on a shoulder, 94, extending radially inwardly from the nut rearward end 38", which thrust surface is abuttingly engageable with a rearwardly-facing bearing surface, 96, formed about the coupler 30" intermediate the forward and rearward ends 34" and 38" thereof. Also, with reference to FIG. 13a which is a magnified view of the area referenced at 98 in FIG. 13, it may be better seen how the connection 10" is sealed against contaminants with the aforementioned forward thread seal of the connection being noted at 100 and the aforementioned rearward seal of the connection between the nut thrust surface 66" and the corresponding coupler bearing surface, such as surface 96, being noted at 102.

Figure 14:
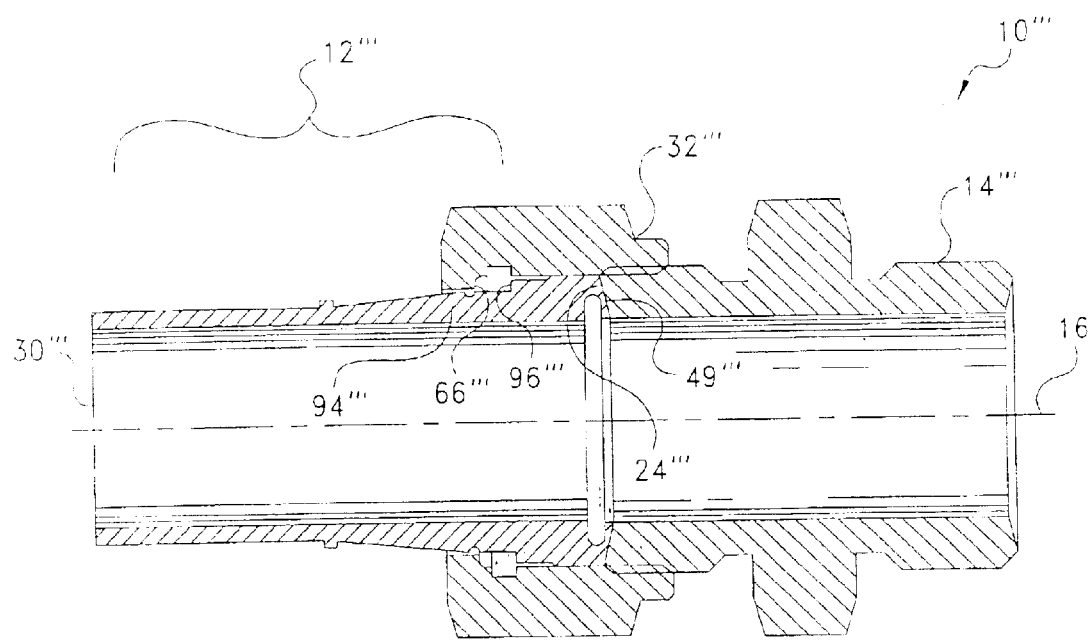
FIG. 14 is a longitudinal cross-sectional view showing the initial, hand-tight connection of the fitting to the connector in yet another alternative style of the connection of the present invention.
Figure 15:
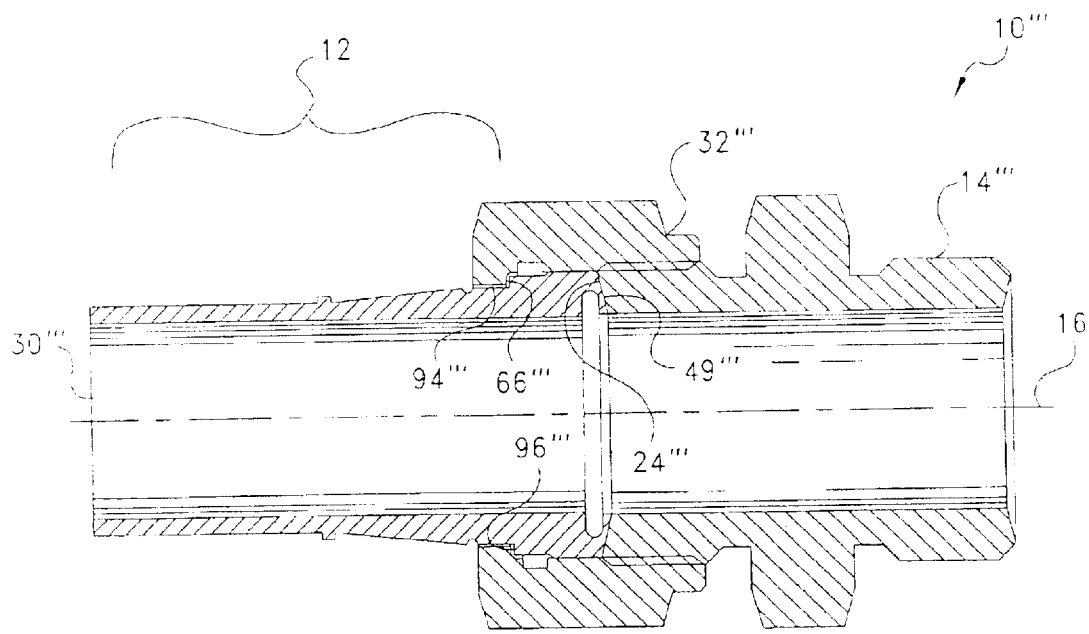
FIG. 15 is a longitudinal cross-sectional view as in FIG. 14 showing the final connection of the fitting to the connector.

Referring lastly to FIGS. 14–15, connection 10 now again reappears at 10''' as provided with fitting 12''' being configured for a beam swivel-style connection, such as per AS4209 or AS4227, to connector 14''' which may be as per AS4207. In this regard, fitting 12''' has a nut 32''' which includes thrust surface 66''' formed on shoulder 94''' thereof, which thrust surface is abuttingly engageable with coupler bearing surface 96'''. Further, coupler 30''' has a rearwardly-tapered sealing surface 49''' which mates with the forwardly-tapered sealing surface 24''' of connector 14'''. In view of FIGS. 10–15, it will be appreciated that the fitting of the present invention may be readily adapted for use in a variety of connection styles in accordance with commercial, military, or other specifications, but without substantial change to the basics of the componentry of the fitting and/or to the connector.

The materials of construction for the componentry of the connection 10 may be considered conventional for the application involved, and as generally may be selected for strength, corrosion or temperature resistance, or other physical or mechanical property, or otherwise for compatibility with the tubing being used, the service environment, and/or the fluid being handled. Such fluid may be a liquid such as water, hydraulic oil, a hydrocarbon fuel or other petrochemical, or a process stream. Alternatively, the fluid may be air, such as in a pneumatic application, or another gas.

Although plastics, composites, and other materials may be used where the application permits, the connection componentry in general may be machined, stamped, cast, molded, or otherwise constructed of a metal, which may be same or different for each of the components, such as copper, brass, steel, stainless steel, titanium, or aluminum, or an alloy such as nickel-copper, Hastelloy®, Alloy 600, 6Mo, Inconel®, or Incoloy®. If necessary or desired, the components may be case hardened by a chemical process such as nitriding, carburizing, or Kolsterizing, or by heat treatment or other treatment method such as precipitation hardening, work hardening, or a surface coating or plating. Additionally, the work surfaces may be coated, such as by a chemical solution plating or another means such as a physical or chemical vapor deposition, with molybdenum disulfide, silver or other lubricious material to reduce the required assembly torque and/or any potential for galling.

Thus, a unique "lockwireless" fitting construction is described herein which eliminates the need for a special adapter, and which is robust and economical to manufacture. Such construction, moreover, employs componentry which is standard in the field, and the use of which will be readily familiar to most installation or maintenance technicians and other personnel.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A fitting assembly for connection to a connector having a rearward sealing surface, the assembly comprising:

a generally annular coupler extending intermediate a first forward end and a first rearward end, and having a first inner peripheral surface and a first outer peripheral surface, and a series of first engagement portions disposed circumferentially about at least a section of the first outer peripheral surface, the first outer peripheral surface having a circumferential first groove formed therein intermediate the first rearward end and the first engagement portions, the first groove having a rearward end wall and a forward end wall; and a generally annular nut receivable coaxially over the first outer peripheral surface of the coupler, the nut extending intermediate a second forward end rotatably threadably engageable with the connector and a second rearward end, and having a second inner peripheral surface and a second outer peripheral surface, and a series of second engagement portions disposed circumferentially about at least a section of the second inner peripheral surface, and the nut having a thrust surface extending radially inwardly from the second inner peripheral surface, whereby with the nut second rearward end being received coaxially over the first outer peripheral surface of the coupler, the nut thrust surface is receivable within the groove in a first axial position of the nut intermediate the rearward and forward end walls thereof with the first and second engagement portions being interferingly engaged such that the coupler first forward end is drawn towards the connector sealing surface as the nut second forward end is threadably engaged with the connector, and in a second axial position of the nut in abutting contact with the groove forward end wall as the nut second forward end is further threadably engaged with the connector urging the coupler first forward end into a sealing engagement with the connector sealing surface, whereby with the coupler first forward end being engaged with the connector sealing surface, the first and second engagement portions are interengaged delimiting the rotation of the nut relative to the connector.

2. The fitting assembly of claim 1 wherein the coupler has an indicia marked intermediate the first rearward end and the first engagement portions, the indicia being hidden by the nut as the nut second forward end is threadably engaged with the connector urging the coupler first forward end into a sealing engagement with the connector sealing surface, and the indicia being revealed by the nut when the coupler first forward end is sealingly engaged with the connector sealing surface.

3. A fitting assembly for connection to a connector having a rearward sealing surface, the assembly comprising:

a generally annular coupler extending intermediate a first forward end and a first rearward end, and having a first inner peripheral surface and a first outer peripheral surface, and a series of first engagement portions disposed circumferentially about at least a section of the first outer peripheral surface, the first engagement portions being provided as recesses formed in the coupler first outer peripheral surface;

a generally annular nut receivable coaxially over the first outer peripheral surface of the coupler, the nut extending intermediate a second forward end rotatably threadably engageable with the connector and a second rearward end, and having a second inner peripheral surface and a second outer peripheral surface, and a series of second engagement portions disposed circumferentially about at least a section of the second inner peripheral surface, and the nut having a second inner peripheral surface has a circumferential second groove formed therein intermediate the second forward and rearward ends thereof; and a spring clip received within the nut second groove, the clip having lobes which extend radially inwardly to define the second engagement portions and which are configured to interferingly engage the coupler recesses, whereby with the nut second rearward end being received coaxially over the first outer peripheral surface of the coupler, the nut second forward end is threadably engageable with the connector urging the coupler first forward end into a sealing engagement with the connector sealing surface, and whereby with the coupler first forward end being engaged with the connector sealing surface, the first and second engagement portions are interengaged delimiting the rotation of the nut relative to the connector.

4. The fitting assembly of claim 3 wherein the clip is resiliently expandable radially within the second groove to be receivable over the first engagement portions as the nut second forward end is threadably engaged with the connector, and being resiliently contractible within the second groove for the lobes to be interferingly engaged with the coupler recesses for the interengagement of the first and second engagement portions.

5. The fitting assembly of claim 4 wherein the clip is further resiliently expandable radially within the second groove to be receivable over the first engagement portions as the nut second forward end is threadably disengaged from the connector.

6. The fitting assembly of claim 3 wherein:
the nut has a pair of radial slots formed therein, each of the slots opening into the second groove through the nut second inner peripheral surface; and
the clip ring is configured as a split ring extending circumferential from a first ring end to a second ring end, each of the ring ends having a extension extending radially outwardly therefrom, the clip ring being received within the second groove with each extension being received in a corresponding one of the slots.

7. The fitting assembly of claim 3 wherein:
the nut has a radial slot formed therein opening into the second groove through the nut second inner peripheral surface; and
the clip ring is configured as a split ring extending circumferential from a first ring end to a second ring end, each of the ring ends having a extension extending radially outwardly therefrom, the clip ring being received within the second groove with each extension being received in the slot.

8. A connection comprising:
a connector having a rearward sealing surface;
a generally annular coupler extending intermediate a first forward end and a first rearward end, and having a first inner peripheral surface and a first outer peripheral surface, and a series of first engagement portions disposed circumferentially about at least a section of the first outer peripheral surface, the first outer peripheral surface having a circumferential first groove formed therein intermediate the first rearward end and the first engagement portions, the first groove having a rearward end wall and a forward end wall; and
a generally annular nut receivable coaxially over the first outer peripheral surface of the coupler, the nut extending intermediate a second forward end rotatably threadably engageable with the connector and a second rearward end, and having a second inner peripheral surface and a second outer peripheral surface, and a series of second engagement portions disposed circumferentially about at least a section of the second inner peripheral surface, and the nut having a thrust surface extending radially inwardly from the second inner peripheral surface,
whereby with the nut second rearward end being received coaxially over the first outer peripheral surface of the coupler, the nut thrust surface is receivable within the groove in a first axial position of the nut intermediate the rearward and forward end walls thereof with the first and second engagement portions being interferingly engaged such that the coupler first forward end is drawn towards the connector sealing surface as the nut second forward end is threadably engaged with the connector, and in a second axial position of the nut in abutting contact with the groove forward end wall as the nut second forward end is further threadably engaged with the connector urging the coupler first forward end into a sealing engagement with the connector sealing surface, and
whereby with the coupler first forward end being engaged with the connector sealing surface, the first and second engagement portions are interengaged delimiting the rotation of the nut relative to the connector.

9. The connection of claim 8 wherein the coupler has an indicia marked intermediate the first rearward end and the first engagement portions, the indicia being hidden by the nut as the nut second forward end is threadably engaged with the connector urging the coupler first forward end into a sealing engagement with the connector sealing surface, and the indicia being revealed by the nut when the coupler first forward end is sealingly engaged with the connector sealing surface.

10. A connection comprising:
a connector having a rearward sealing surface;
a generally annular coupler extending intermediate a first forward end and a first rearward end, and having a first inner peripheral surface and a first outer peripheral surface, and a series of first engagement portions disposed circumferentially about at least a section of the first outer peripheral surface, the first engagement portions being provided as recesses formed in the coupler first outer peripheral surface;
a generally annular nut receivable coaxially over the first outer peripheral surface of the coupler, the nut extending intermediate a second forward end rotatably threadably engageable with the connector and a second rearward end, and having a second inner peripheral surface and a second outer peripheral surface, and a series of second engagement portions disposed circumferentially about at least a section of the second inner peripheral surface, the nut second inner peripheral surface having a circumferential second groove formed therein intermediate the second forward and rearward ends thereof; and
a spring clip received within the second groove, the clip having lobes which extend radially inwardly to define the second engagement portions and which are configured to interferingly engage the coupler recesses,
whereby with the nut second rearward end being received coaxially over the first outer peripheral surface of the coupler, the nut second forward end is threadably engageable with the connector urging the coupler first forward end into a sealing engagement with the connector sealing surface, and
whereby with the coupler first forward end being engaged with the connector sealing surface, the first and second engagement portions are interengaged delimiting the rotation of the nut relative to the connector.

11. The connection of claim 10 wherein the clip is resiliently expandable radially within the second groove to be receivable over the first engagement portions as the nut second forward end is threadably engaged with the connector, and being resiliently contractible within the second groove for the lobes to be interferingly engaged with the coupler recesses for the interengagement of the first and second engagement portions.

12. The connection of claim 11 wherein the clip is further resiliently expandable radially within the second groove to be receivable over the first engagement portions as the nut second forward end is threadably disengaged from the connector.

13. The connection of claim 10 wherein:
the nut has a pair of radial slots formed therein, each of the slots opening into the second groove through the nut second inner peripheral surface; and
the clip ring is configured as a split ring extending circumferential from a first ring end to a second ring end, each of the ring ends having a extension extending radially outwardly therefrom, the clip ring being received within the second groove with each extension being received in a corresponding one of the slots.

14. The connection of claim 10 wherein:

the nut has a radial slot formed therein opening into the second groove through the nut second inner peripheral surface; and the clip ring is configured as a split ring extending circumferential from a first ring end to a second ring end, each of the ring ends having a extension extending radially outwardly therefrom, the clip ring being received within the second groove with each extension being received in the slot.

* * * * *